Dec. 10, 1940.                W. E. GEER                2,224,813

POWER-DRIVE MOUNTING

Filed March 23, 1938

Inventor:
William E. Geer.
By Homer & Swret.
Attorney.

Patented Dec. 10, 1940

2,224,813

UNITED STATES PATENT OFFICE 2,224,813

POWER-DRIVE MOUNTING

William E. Geer, Denver, Colo., assignor to A. R. Wilfley and Sons, Incorporated, Denver, Colo., a corporation of Colorado Application March 23, 1938, Serial No. 197,668

1 Claim. (Cl. 248—23)

This invention relates to improved means for mounting a power unit in driving relation with elements to be actuated thereby, and has as an object to provide an improved mounting susceptible of ready association with power-actuated machines, tools, and apparatus of various types.

A further object of the invention is to provide an improved power-drive mounting for fixed installation relative to the apparatus to be driven, and which permits of adjustable positioning of the power unit relative to such apparatus.

A further object of the invention is to provide an improved mounting for a power unit in driving relation with power-actuated apparatus, which mounting permits of adjustment of the power unit position in perpendicularly-related planes without variation of the fixed relation between the mounting and the associated apparatus.

A further object of the invention is to provide an improved power-drive mounting which permits adjustable positioning of the power unit in relatively close overhead relation with associated driven apparatus, and which interferes but little with ready and convenient access to such associated apparatus.

My invention consists in the construction, arrangement, and combination of elements hereinafter set forth, pointed out in my claim, and illustrated by the accompanying drawing, in which—

Figure 1:
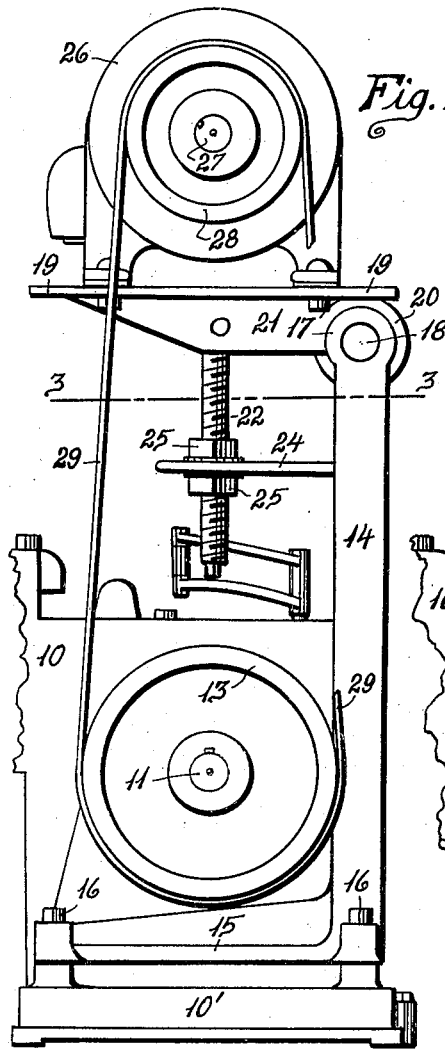
Figure 2:
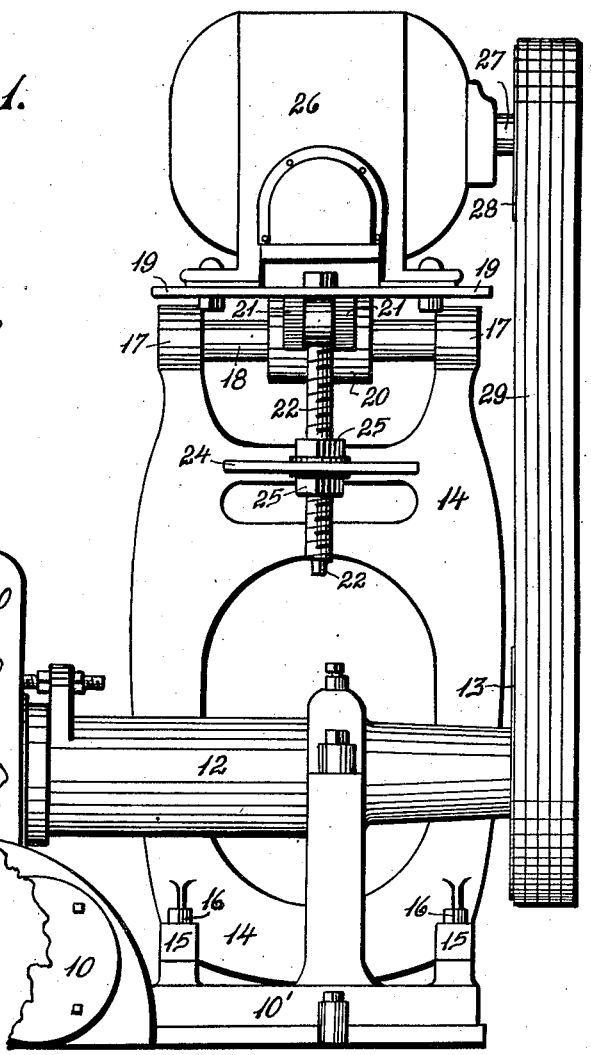
Figure 3:
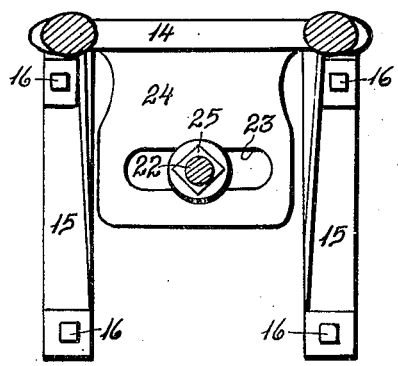

Figure 1 is an end elevation of my improved mounting as installed in operative association with power-actuated apparatus, portions of the apparatus not essential to an understanding of the invention being broken away to conserve space. Figure 2 is a front elevation of and at right angles to the showing of Figure 1. Figure 3 is a transverse section of the improved mounting alone, taken on the indicated line 3—3 of Figure 1.

In the construction of the improvement as shown, the numeral 10 designates a conventionalized mechanical assembly adapted for power actuation through the agency of a shaft 11 housed within a torque tube or bearing housing 12 and carrying a belt pulley, or equivalent power-transmitting element 13 on its outer end. The assemblies and elements 10, 11, 12 and 13 are strictly conventional and merely typical of an infinite number of mechanical units or assemblies arranged for power actuation and with which the invention may be advantageously associated, the element 13 being representative of any type of pulley, chain sprocket, or gear adapted to be power driven for the actuation of other elements of its assembly.

The improved mounting includes a rigid, unitary frame or bracket, L-shaped in side elevation, and comprising a vertical web or frame portion 14 and integral, perpendicularly related arms 15 projecting in spaced, parallel relation from the lower portion of the web 14. The lower surfaces of the arms 15 lie in a common plane and are adapted to engage against a base portion 10' of the assembly 10, or against an independent base or floor adjacent such apparatus, and are provided with apertured bosses adjacent their free ends as well as adjacent their junction with the frame 14 wherethrough suitable bolts or screws 16 engage with the supporting base to mount the frame assembly in fixed relation with the element 13 and with the web portion 14 substantially vertical and at one side of the shaft 11, the arms 15 conveniently extending beneath and projecting on the opposite side beyond said shaft. The upper end of the web 14 is formed as an upwardly-opening yoke whereof the arm elements terminate in spaced bosses 17 apertured to receive and support a shaft element 18 thus mounted in parallel relation with the shaft 11.

The mounting element which supports the power unit is in the form of a bracket plate 19 provided with a mounting boss 20 in fixed relation adjacent one margin of the plate 19, substantially midway of said plate margin, and having a length considerably less than the spacing between the bosses 17 of the frame yoke arms. The mounting boss 20 is apertured to receive and slide freely on the shaft 18 between the bosses 17, and thereby hingedly mount the plate 19 in overhanging relation with the shaft 11, suitable reinforcing ribs 21 extending outwardly from the boss 20 in supporting relation across and beneath the central portion of the plate 19. The plate 19 is thus mounted for adjustment through a vertical arc about the hinge axis provided by the shaft 18, and for lateral adjustment relative to the web 14. To adjustably support the plate 19 in the desired position, a threaded stem 22 is hinged at its upper end to and depends freely from the central portion of the plate 19 and engages through a laterally-elongated slot 23 formed in a bracket plate 24 extending perpendicularly from the web 14 in spaced relation below the shaft 18, said bracket plate preferably being formed integrally with said web portion. Nuts 25 threadedly engage the stem 22 on opposite sides of the bracket plate 24 in position to clamp against said plate and secure said stem relative to said plate, thereby positioning the plate 19 in adjustably fixed relation with the web 14.

A power unit, such as an electric motor 26, is mounted on and in fixed relation with the upper surface of the plate 19 with its driving shaft 27 in parallel relation with the driven shaft 11 of the apparatus to be actuated by said power unit, and a belt pulley 28, or equivalent element, is fixed to the end of the shaft 27 in operative alignment with the driven pulley 13, accurate adjustment of the pulley alignment being made possible through the shiftable mounting of the plate 19 on its shaft 18, the lateral elongation of the slot 23 permitting the stem 22 to shift in the bracket plate 24 as the plate 19 is adjusted laterally of the web 14. The pulleys 13 and 28 are operatively interconnected by means of a belt assembly 29, or operatively equivalent means, wherein the tension may be adjusted by adjustment of the plate 19 about its hinge axis through manipulation of the nuts 25 axially of the stem 22.

In practical use, the improved mounting assembly greatly facilitates adaptation of unit power drives to mechanical assemblies and machines of various types, and provides a power unit mounting which permits free access to the operative elements of the machine or apparatus wherewith it is associated and provides for simple and convenient adjustment in the operative relation between the power unit and the driven elements of the associated apparatus.

Since many changes, variations, and modifications in the specific form, construction, and arrangement of the elements shown and described may be had without departing from the spirit of my invention, I wish to be understood as being limited solely by the scope of the appended claim, rather than by any details of the illustrative showing and foregoing description.

I claim as my invention—

A power unit mounting for power-driven apparatus comprising a rigid, L-shaped mounting bracket adapted to be secured to the associated apparatus by means of its relatively shorter member for vertical disposition of its relatively longer member, a yoke formed on the upper end of said vertical bracket member, a horizontally-disposed pintle traversing said yoke, a supporting plate adapted to receive and mount a power unit hingedly and slidably engaging at one margin with said pintle in overhanging relation with the relatively shorter member of said mounting bracket, an apertured lug projecting in fixed relation perpendicularly from the vertical bracket member beneath said plate, a threaded stem hingedly depending from said plate in transversely slidable intersecting relation through said lug, and clamp nuts threadedly engaging said stem in bearing relation with said lug to adjustably position and hold said plate relative to said mounting bracket.

WILLIAM E. GEER.